Aug. 5, 1952     C. H. BERGQUIST     2,605,923
OUTLET BOX AND MOUNTING BRACKET THEREFOR
Filed March 6, 1948
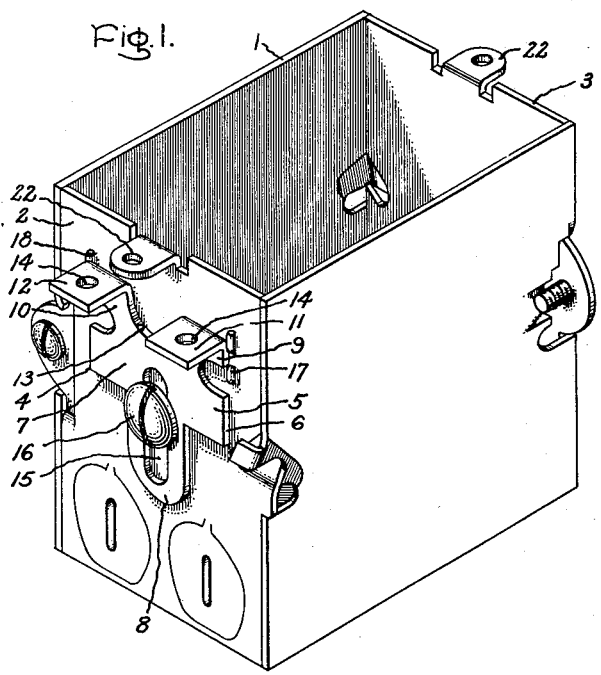
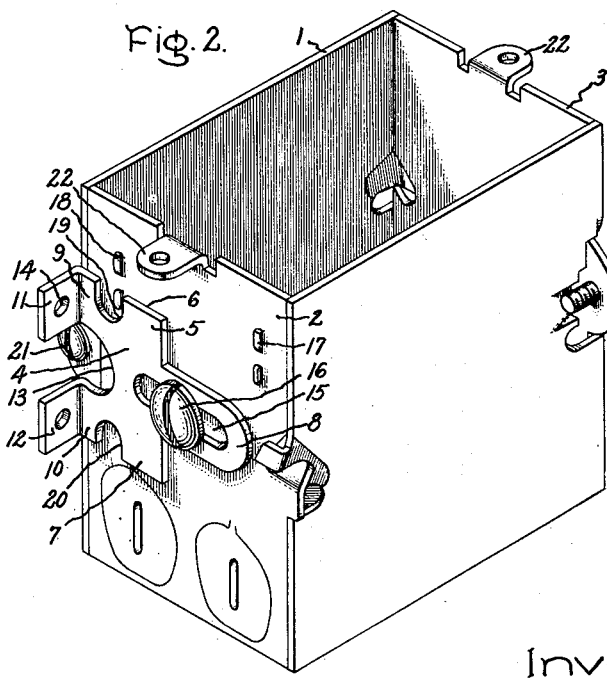
Inventor:
Carl H. Bergquist,
by Alfred E. Pobst,
His Attorney.

Patented Aug. 5, 1952

2,605,923

UNITED STATES PATENT OFFICE 2,605,923

OUTLET BOX AND MOUNTING BRACKET THEREFOR

Carl H. Bergquist, Stratford, Conn., assignor to General Electric Company, a corporation of New York Application March 6, 1948, Serial No. 13,483

1 Claim. (Cl. 220—3.9)

The present invention relates to electric outlet boxes, particularly switch and receptacle boxes, and mounting brackets or "ears" for the same.

It is an object of my invention to provide an adjustable mounting ear for a switch box or the like which is secured to the box by a single screw, but which in combination with elements of the box will nevertheless prevent twisting of the box. A further object of my invention is to provide an adjustable switch box mounting ear which can readily be turned through an angle of 90° to permit fastening the box to a support from the side instead of from the front without removing the bracket or its securing screw. A still further object of my invention is to provide a switch box mounting ear which has the advantages enumerated above and which can be made from a minimum amount of material.

My invention will best be understood from the following description taken in connection with the accompanying drawing in which Fig. 1 is a perspective view of a sectional switch box having a mounting ear secured to one end thereof in position for fastening the box to a support from the front of the box and Fig. 2 is a perspective view similar to that of Fig. 1, but showing the mounting ear in position for fastening the box to a support from the side.

I have illustrated my invention as applied to a sectional switch box, but it will be understood that my invention may equally well be applied to other forms of switch and receptacle boxes. In the drawing there is shown a sectional switch box 1 having ends 2 and 3 to which mounting ears 4 may be secured. Each ear 4 is punched and formed from sheet metal. It comprises a substantially rectangular body portion 5 having parallel sides 6 and 7. A rounded end tail portion extends from one end of the body portion 5. Two arms 9 and 10 extend from the opposite side of the body portion, the ends of the arms being bent at right angles to the plane of the body portion forming fastening ears 11 and 12. These are provided with holes 14 adapted to receive nails, screws, or other suitable fastening means. The space between the arms 9 and 10 forms a rounded mouth 13 shaped to correspond with the rounded end of the tail 8. By this means my mounting ears can be punched from sheet metal strip stock and can be punched and formed in a continuous manner, as on a slide machine, with a minimum of material and with a minimum of scrap. The space or mouth between the arms 9 and 10 is required to clear the lugs 22 provided on the end walls of the box for the mounting of switch or receptacle elements. The tail portion 8 of my mounting ear is slotted as shown at 15, the slot extending a short distance into the body portion 5. A screw 16, threaded into a hole in the switch box wall, passes through the slot 15 and serves adjustably to fasten the ear 4 to the box.

For front mounting of the box, the ear 4 is positioned as shown in Fig. 1 with the bent ear elements 11 and 12 in a plane parallel to the open front of the box. By loosening the screw 16 the ear 4 can be slid up and down to position the plane of the bent elements 11 and 12 at the proper distance from the plane of the open front of the box so that the latter will be flush with the plaster or other surface of the wall in which the box is mounted. When the screw 16 is tightened, the ear 4 will be firmly held in the adjusted position. While single screw mounting ears have previously been proposed in the art, they have not been altogether satisfactory and for the most part present practice is to provide two ear securing screws which not only increases the time required to adjust the ear, but also increases the cost. The reason for this is that single screw ears heretofore suggested have permitted the box to twist after it was fastened to its support. The friction provided by the head of a single screw such as 16 is ordinarily sufficient to prevent sliding of the ear relative to the box, but this is not true with respect to resistance to relative twist between the ear and the box, particularly in the direction tending to loosen the screw.

To overcome this difficulty, I provide parallel elongated projections 17 and 18 extending outwardly from the end wall of the box to a distance somewhat greater than the thickness of the stock of which the ear 4 is made. The projections 17 and 18 are spaced equidistantly from the center line of the end wall of the box, on which line is located the threaded hole for receiving the fastening screw 16. The space between the inner edges of the projections 17 and 18 is equal to the width of the body portion of the ear 4 so that the projections are adapted to receive between them the parallel sides 6, 7 of the body portion of the ear. The projections are located approximately midway between the screw 16 and the front edge of the end of the box. Thus, when the screw 16 is tightened to a reasonable degree, the projections 17 and 18 will entirely prevent any relative twisting between the box 1 and the ear 4 throughout the entire range of adjustment in the position of the ear as provided by the slot 15.

The projections 17 and 18 are preferably integral with the end 2 of the box and appear as bumps projecting from the end wall surface. I prefer to produce these projections by lancing the box wall with a punch having a radius ground in its center so that the center portion of the projection is not lanced out as far as the end portions and is therefore still firmly joined to the end wall 2 of the box. The lancings therefore cannot fall out.

While switch boxes are usually mounted from the front so that the mounting ear is positioned as shown in Fig. 1, conditions are occasionally met in which it is desirable to be able to fasten the box from the side. For this purpose it is only necessary, after loosening screw 16, to rotate the ear 4 ninety degrees so that the bent ear elements 11 and 12 are flush with the side of the box as shown in Fig. 2.

In order firmly to position the ear for side mounting and to permit quick locating of the ear with the elements 11 and 12 flush with the side of the box, notches 19 and 20 are cut into the sides 6 and 7 of the body portion 5 of the ear. These notches are of such a size and shape and so located that one of them will engage the lower end of one of the projections 17 or 18 on the end wall of the box. As illustrated in Fig. 2, the notch 19 engages the lower end of projection 18. In this position of the ear, the mouth 13 provides clearance for the box assembling screw 21. It will be evident that the ear may also be turned in the opposite direction so that the notch 20 engages the lower end of the projection 17.

It will be observed that in changing the position of the ear from that of Fig. 1 to that of Fig. 2 only a single screw needs to be loosened, the ear rotated and the screw retightened. Only a single screw is required and it is not necessary to remove the ear or any screw. It will be observed that in both positions the ear is firmly held against twisting and can quickly be suitably positioned.

What I claim as new and desire to secure by Letters Patent in the United States is:

The combination of an electric outlet box and an adjustable mounting ear therefor adapted to be cut and formed from a sheet metal strip with minimum wastage, said outlet box including an end wall having a threaded opening therein, said mounting ear comprising a body portion, a pair of parallel spaced apart arms extending axially from said body portion, an elongated tail portion including an elongated slot and a single threaded securing means positioned in said slot to be engageable with said threaded opening, said ear body portion having substantially parallel sides, a pair of spaced apart elongated projections expressed from said outlet box end wall for guiding relationship with said mounting ear when the same is in the front mounting position, each of the parallel sides of said ear having an indented notch, one of said notches being registerable with one of said expressed projections to provide a stop when said ear is in a side mounting position, said parallel spaced arms each including a portion in the plane of said body portion and a portion perpendicular to said body portion with said perpendicular portion including apertures to provide for the mounting of said box, said tail portion extending axially from said body portion at an end opposite said arms, said tail portion being so shaped as to fit in the space between said extending arms to provide for cutting of mounting ear blanks from strips with minimum wastage, said slot defined by said tail portion extending axially of said body portion to guide and position said mounting ear, said single threaded securing means being capable of locking said ear to said box end wall and further providing for the pivoting of said mounting ear and said elongated slot to guide one of said notches into engagement with one of said expressed projections to insure the positive positioning of said ear for the side mounting of said box.

CARL H. BERGQUIST.

REFERENCES CITED

The following references are of record in the file of this patent:

UNITED STATES PATENTS

| Number | Name | Date |
|---|---|---|
| 876,187 | Hornsby | Jan. 7, 1908 |
| 956,674 | Bonnell | May 3, 1910 |
| 989,854 | Kruse | Apr. 18, 1911 |
| 1,221,944 | Wurdack | Apr. 10, 1917 |
| 1,225,525 | Sweet | May 8, 1917 |
| 1,552,911 | Calhoun | Sept. 8, 1928 |
| 1,956,348 | Goodwin et al. | Apr. 24, 1934 |
| 2,348,318 | Austin, Jr. | May 9, 1944 |
| 2,360,004 | MacLean, Jr. | Oct. 10, 1944 |

FOREIGN PATENTS

| Number | Country | Date |
|---|---|---|
| 59,250 | Denmark | Nov. 17, 1941 |